May 10, 1960 ICHIRO HAKOGI 2,936,059
ALL-AUTOMATIC APPARATUS FOR HANDLING CURVED-SURFACE ARTICLES
Filed Dec. 21, 1954 7 Sheets-Sheet 1

Inventor
Ichiro Hakogi

By Michael S. Striker agt.

May 10, 1960 ICHIRO HAKOGI 2,936,059
ALL-AUTOMATIC APPARATUS FOR HANDLING CURVED-SURFACE ARTICLES
Filed Dec. 21, 1954 7 Sheets-Sheet 4

Fig. 8

Inventor
Ichiro Hakogi

By Michael S. Striker
agt.

May 10, 1960  ICHIRO HAKOGI  2,936,059
ALL-AUTOMATIC APPARATUS FOR HANDLING CURVED-SURFACE ARTICLES
Filed Dec. 21, 1954  7 Sheets-Sheet 6

Inventor
Ichiro Hakogi
By Michael S. Striker
agt

May 10, 1960  ICHIRO HAKOGI  2,936,059
ALL-AUTOMATIC APPARATUS FOR HANDLING CURVED-SURFACE ARTICLES
Filed Dec. 21, 1954  7 Sheets-Sheet 7

Inventor
Ichiro Hakogi
By Michael S. Striker
agt.

United States Patent Office 2,936,059
Patented May 10, 1960

2,936,059
ALL-AUTOMATIC APPARATUS FOR HANDLING CURVED-SURFACE ARTICLES

Ichiro Hakogi, Setagaya-ku, Tokyo, Japan

Application December 21, 1954, Serial No. 476,766

4 Claims. (Cl. 198—30)

This invention relates to a printing apparatus for printing curved-surface articles such as bottles and the like, and consisting of a device for feeding the articles to be printed, a device for orienting the articles to be printed, a printing device, and a device for delivering the articles that have been printed. The object of this invention is to obtain an efficient apparatus for printing curved-surface articles which operates together these devices continuously and automatically, omits man power, is fast and moreover suitable for mass production. More particularly, the present invention relates to an apparatus for printing curved-surface articles comprising a device for feeding the articles to be printed automatically from a hopper onto an endless feeding belt which runs practically parallel with, at one side of, and at the same linear velocity an endless chain conveyor and means for gradual transfer of said articles onto the said driving endless belt conveyor said means including a member provided at the side adjacent the endless chain conveyor and inclined towards same in direction of its progress, a device for orienting the articles to be printed on the endless chain conveyor, by rotating the articles on the driving endless chain conveyor until a bump provided on one side of the articles is caught by a stopper thrust out above the driving endless chain conveyor, for printing the curved surface of the articles through a screen having a desired printing pattern, during rotation of the articles on the driving endless chain conveyor, and a device for continuously delivering the articles that have been printed.

In the drawings wherein an embodiment of this invention is shown.

Now, an embodiment of this invention shall be described by taking as an example a curved-surface printing of a round shaped bottle, and the respective devices thereof shall each be explained by referring to the appended drawings.

Figure 1:
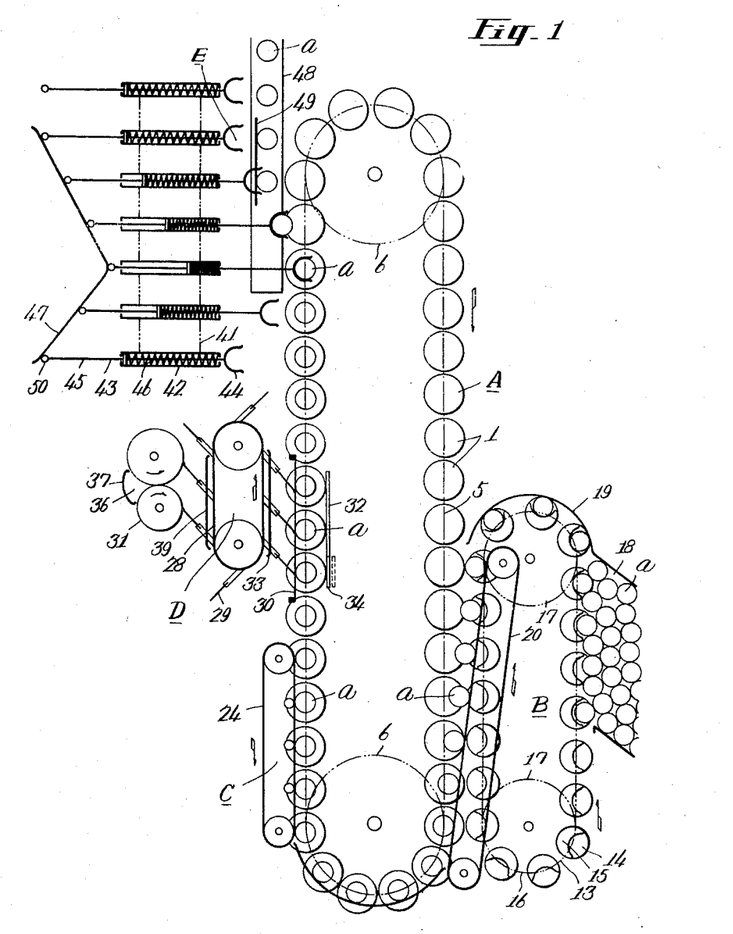
Fig. 1 is a schematic view of the entire setup.
Figure 2:
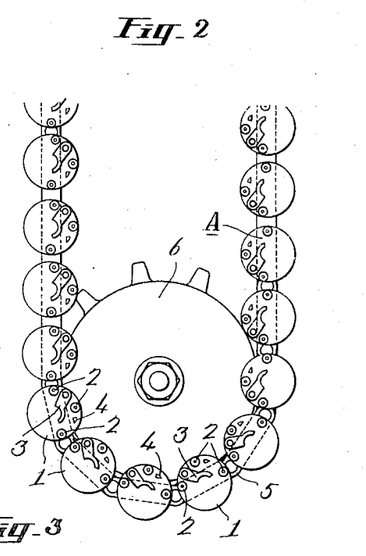
Fig. 2 is a plan view of an endless chain conveyor.
Figure 3:
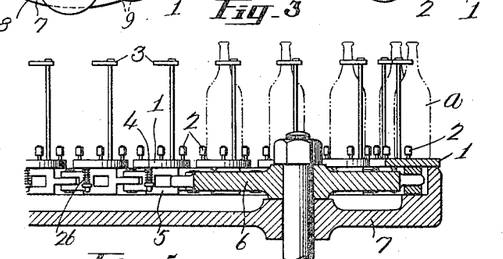
Fig. 3 is a sectional side view thereof.
Figure 4:
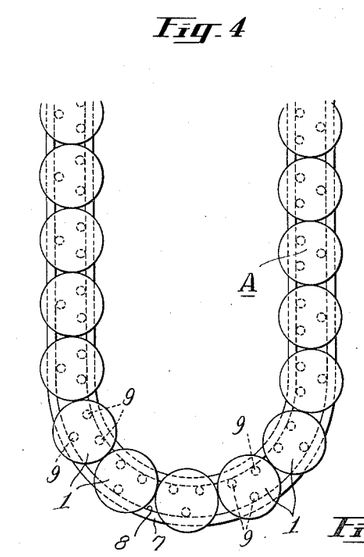
Fig. 4 is a plan view which shows another example of an endless chain conveyor.
Figure 5:
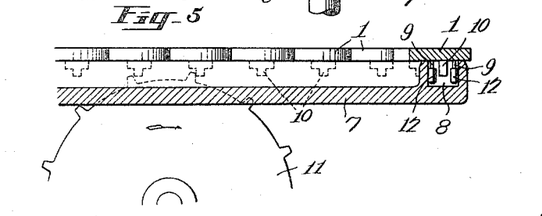
Fig. 5 is a sectional side view thereof.

First of all, as shown in Figs. 2 and 3, the driving endless chain conveyor A has a number of discs 1 which are connected at equal spaces between them. On the upper surface of these discs are provided a plurality of small holding rollers 2 to hold the bottom part of the bottles $a$ which are to be printed and a supporter 3 to support the top part of the said bottles; furthermore a stopper 4 for setting the direction of the article to be printed, which shall be explained later, is provided so that it can push up from and drop down into the disc. The discs 1 revolve in one direction on top of a frame 7 by means of a motor which rotates a pair of sprockets 6 connected to an endless chain 5. However, various kinds of this type of conveyor can be considered. For example, as shown in Figs. 4 and 5, a bilge channel 8 is provided on the frame 7 and a plurality of the discs 1 whose projecting members 9 are interposed in said channel are placed on the top edge of the frame 7, said discs 1 touching each other. Projections 10 set at a suitable place under each disc 1 are successively pushed forward by a sprocket 11, thus moving in order each disc 1 in one direction along the channel 8. As shown in Fig. 5, there are three projecting members 9, each of which has a roller 12. The said rollers 12 come in contact with the inside wall of the channel 8 to make movement smooth and moreover be able to prevent the discs 1 from rotating. In short, the driving endless chain conveyor in this apparatus would suffice if it achieves the purpose of moving the bottles $a$ endlessly in a steadied state at a uniform speed in one direction.

Figures 6, 7, 9, 10:
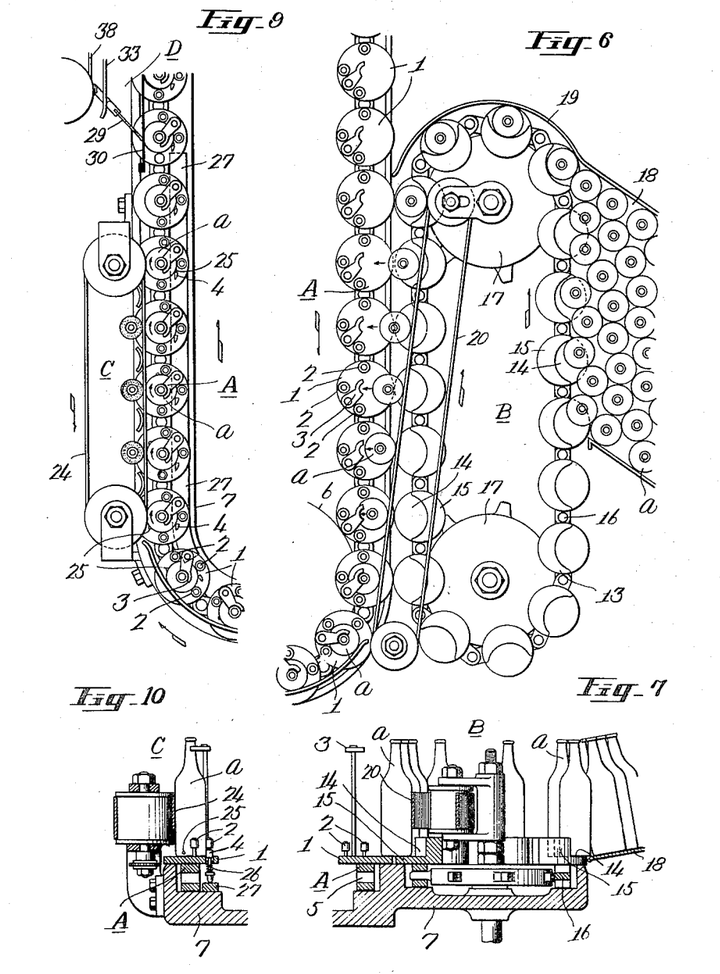
Fig. 6 is a plan view of a device for feeding articles to be printed.
Fig. 7 is a sectional side view thereof.
Fig. 9 is a plan view of a device for setting the direction of the articles to be printed.
Fig. 10 is a sectional side view thereof.
Figure 8:
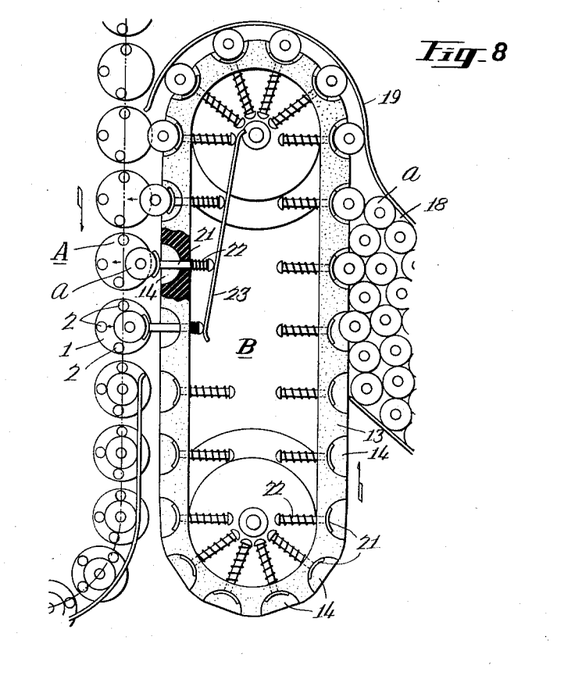
Fig. 8 is a plan view which shows another example of a feeding device.

The feeder B, a device for feeding the articles to be printed, is, as shown in Figs. 6 and 7, adjacent the side of the above driving endless chain conveyor A, and is provided with an endless feeding belt 13 which runs practically in parallel therewith and in opposite direction at the same linear velocity. The said endless belt 13 connects, by means of a chain 16, a plurality of base plates 15 having a circular arc-shaped section on their outer side and provided with a recess 14 whose base is made to be the same height as discs 1 of the driving endless chain conveyor A. These base plates are driven by means of a pair of sprockets 17. At one side of the belt 13 is provided a feeding hopper 18. By feeding from the hopper 18, the bottles $a$ to be printed are accommodated successively one at a time into the recesses 14 and move in one direction riding on the base plates 15 while being prevented from falling off by means of a housing 19. On the side where the driving endless chain conveyor A is there is provided a sending out endless belt 20 which rotates in the same direction as the endless feeding belt 13 at the same linear velocity as the rotating speed of both the conveyors A and 13 and which is inclined from the side of belt 13 towards the conveyor A following the direction of progress. By touching the inner side of the bottles $a$ that are moving, the said bottles $a$ are gradually transferred onto the discs 1 of the driving endless chain conveyor A from the base plates 15 of the endless belt 13 by means of the sending out endless belt 20 as they proceed along. At the terminal end of the endless belt 20 the bottles $a$ are completely fed onto the discs 1. Further, Fig. 8 shows another example of a feeder. It is the same as the foregoing feeder in that an endless feeding belt 13 is provided between the hopper 18 and driving endless chain conveyor A. However, the said endless belt 13 in this case is made of soft material such as rubber, and the conveying recesses 14 are made directly on its outer side. Also there are pushers 21 that can move forward and retract mounted inside the conveying rooms 14. In the back of the recesses 14 the pushers are constantly held back by springs 22 so as not to obstruct the accommodation of the bottles $a$. As the bottles proceed, the end part of the pushers 21 is pressed by guide 23 provided at an incline to the endless belt 13 and the said pushers 21, resisting against the springs 22, are made to move forward, thereby gradually sending out the bottles $a$ and transferring them onto the discs 1 of the driving endless chain conveyor A.

However, the directions of the bottles a fed onto the discs are various. Therefore, it is necessary to set their direction in order to unify the printing position on them. The direction setting device C, as shown in Figs. 9 and 10, is adjacent the side of the driving endless chain conveyor A, and is provided with an endless belt 24 in parallel therewith and running in opposite direction at a different linear velocity. By means of the sides of the bottles a moving on the discs 1 coming in contact with the belt 24, the bottles are made to rotate on the discs 1, by friction, through the difference in their moving speed and the running linear velocity of the endless belt 24. The bottles are rotated until a bump 25 provided beforehand at their lower part is caught by a stopper 4 which is movable above and below the upper surface of the discs 1, whereby each bottle a is successively set in the same direction. That is, the difference between the moving speed of the driving endless chain conveyor A and the running speed of the endless belt 24 would suffice if it fulfills the condition of having the bottles make one rotation by friction while contacting the said belt 24. Further, if a stationary plate in place of the endless belt 24 is set up so as to contact the bottles a, this object can be attained, but in this case there is the drawback in which the object of setting direction cannot be attained since rotary inertia adds upon the bottle because of the difference in speed being too excessive and occasionally the bump 25 goes over the stopper 4 and rotates the bottle too much.

Figure 12:
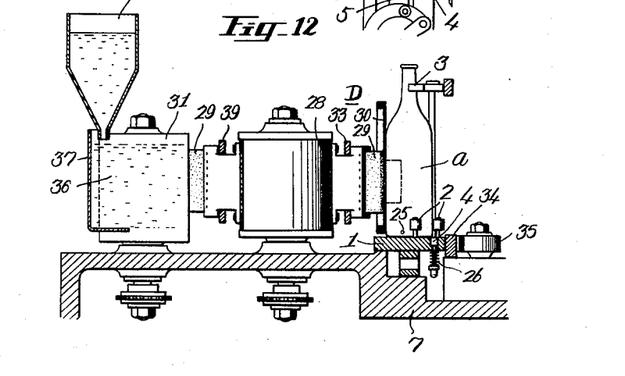
Fig. 12 is a sectional side view thereof.

As shown in Fig. 12, the stoppers 4 in the present direction setting device push up from the top surface of the discs 1 and, as above, securely stop the pumps 25, thus setting the direction of the bottles a which is necessary. But in the part of the printing device D which shall be explained later, the bottles a on the discs 1 need to be rotated and so it is necessary to have the said stoppers 4 go below the surface of the discs 1. For this the stoppers 4 are always held below by springs 26, and in the early stage of this direction setting operation a plate cam 27 provided on the upper surface of the frame 7 pushes up the stoppers from below and protrudes them above the surface of the discs 1 as shown in Fig. 9. After going through the operation of direction setting, they are again dropped below the surface of the discs 1 by the springs 26 by parting with the plate cam 27, prior to the start of the printing operation so as not to be an obstruction thereto.

Figure 11:
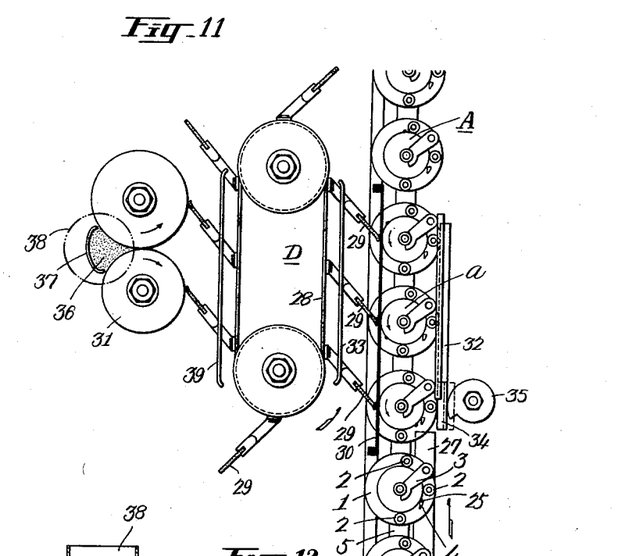
Fig. 11 is a plan view of silk screen printing device.

Next, a printing device D, as shown in Figs. 11 and 12, is provided with an endless belt 28 running at the side of, in parallel with, and in opposite direction at the same linear velocity as the driving endless chain conveyor A, and printing rollers or squeezers 29 extending therefrom are made to press against the bottles a through a screen 30 having a desired printing pattern. The squeezers 29 are made to come in contact with a pair of ink rolls 31 on the other side and are supplied with ink. By moving the squeezers in one direction pressing against the bottles a through the printing pattern of the screen 30, the said bottles a rotate on the discs 1, while moving on, by friction with the screen 30, and a desired printing process is applied to the curved surface thereof. So as to make the printing accurate and vivid by means of making the bottles a and squeezers 29 interposing the screen 30 therebetween during this printing operation press against each other, the discs 1 of the driving endless chain conveyor A and said squeezers 29 are made to press against the bottles by their respective press guides 32, 33. Considering this to be necessary especially at the start of the printing operation, the fore part of the press guide 32 is made into a press guide 34 movable back and forth which is pressed periodically by means of a cam wheel 35, making the discs 1 press towards the screen 30. This brings the contact point between the surface of the bottles a to be printed and the beginning of the printing pattern of the screen completely close together, and makes the register perfect in multi-color and other printings.

Figure 13A:
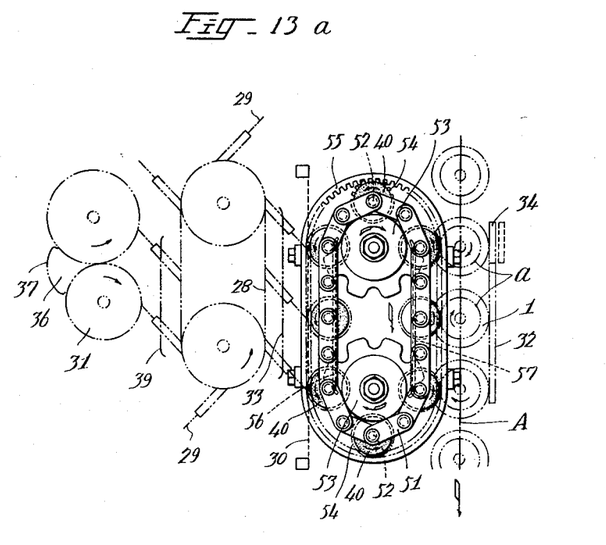
Fig. 13a is a fragmentary plan view in case of effecting off-set silk screen printing.
Figure 13B:
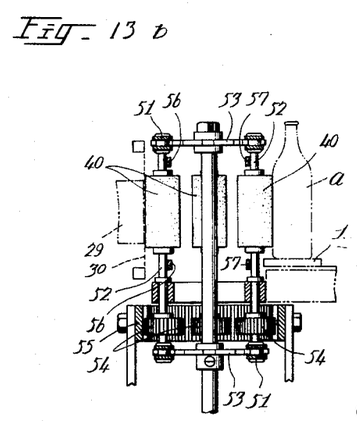
Fig. 13b is a sectional side view thereof.

Furthermore, 37 is an ink chamber set up at the contact of a pair of ink rolls 31 by a wall 37, and at the top thereof is arranged an ink tank 38. In order to ensure the contact between the squeezers 29 and ink rolls 31, a fixed press guide 39 is provided to press against the said squeezers 29. Figs. 13a and 13b show an off-set type silk screen printing device. In this device, blanket cylinders 40 connected endlessly are made to interpose between the bottles a and the screen 30 and are revolved at the same speed as the speed the bottles a are moving. A desired printing pattern is transferred on the surface of the said blanket cylinders 40 through a screen 30 by the squeezers 29, and this is further transferred onto the bottles a. That is, blanket cylinders 40 are secured to axles 52 which are rotatably supported between upper and lower links 51, 51 and are made to travel by means of a pair of sprockets 53 in the direction of the arrows. Meanwhile, gears 54 which are fixed to each of the axles 52 mesh with a circular rack 55 to rotate blanket cylinders 40. By moving at one side the blanket cylinders 40 in relation to squeezers 29 interposing a screen 30 having a desired printing pattern therebetween, the said printing pattern is transferred onto the surfaces of the respective blanket cylinders, and at the other side this is further transferred onto the surfaces of the bottles a which travel resting on the discs 1 while rotating by friction with the blanket cylinders 40, the directions of rotation and travel being shown by the arrows. Further, so as to secure positive contacts between blanket cylinders and bottles a to be printed and between the former and the squeezers 29 when effecting transfer of the printing pattern, each axle 52 is made to travel along inner press guides 56, 57 which gives the blanket cylinders 40 a tendency to be urged outwards.

Figure 14:
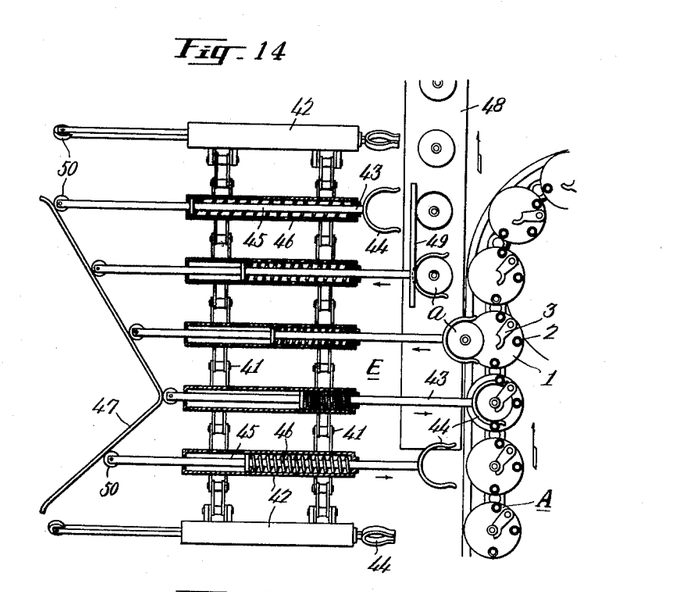
Fig. 14 is a plan view which cuts a portion of a device for delivering the articles that have been printed.
Figure 15:
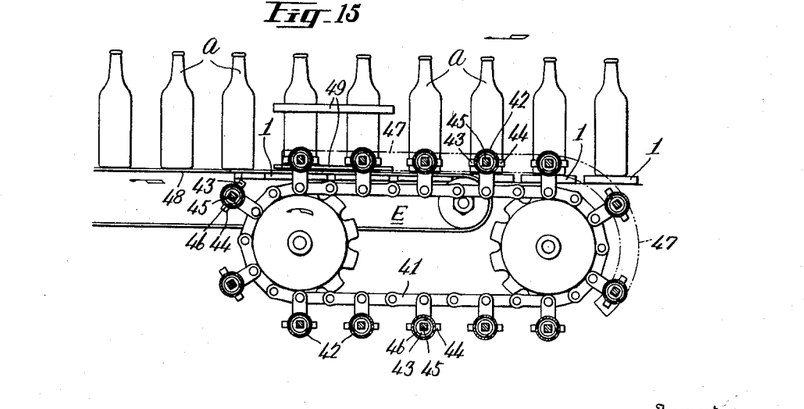
Fig. 15 shows a side view thereof.

Next, as shown in Figs. 14 and 15, a device E for delivering the articles that have been printed is, at the side of the driving endless chain conveyor A, provided with an endless chain 41 running at right angle to the same at the same linear velocity. Tubes 42 are arranged on the said endless chain 41 horizontally and at equal spaces between them as the distance between the respective bottles a. Rods 45 of clamps 43 which extremity is formed into a forked part is enclosed in the said tubes 42 and set slidable back and forth. The clamps 43 are constantly made to move back by the springs 46 towards the side where the bottles are, and their end parts are pressed by a fixed plate cam 47 provided at the other side. The clamps, resisting against the springs 46, are made to thrust out to the bottles a. Further, adjacent to the driving endless chain conveyor A and between the same and the endless chain 41 is provided a delivery belt 41 running in one direction at practically the same level with the discs 1. There is also provided a stopper 49 above the surface of the said belt 41. When the clamps 43 thrust out by means of the fixed plate cam 47, the forked part 44 clamps the bottles a. As the chain 41 rotates, the clamps 43 clamping the bottles a retract by means of the springs 46 in accordance with the displacement of the contacting position with the plate cam 47. After transferring the bottles a onto the conveyor belt 48 from the discs 1, the clamps 43 by means of the stopper 49 at the ending stage of their retraction leave the bottles a on the said belt 48 and further retract. Hence, the bottles a are conveyed to a determined place by the conveyor belt 48. At the extreme end of the clamps 43 are provided small rollers 50 which make the contact movement on the fixed plate cam 47 smooth.

As described above, in the present apparatus, the bottles a required to be printed are conveyed successively one at a time from the hopper 18 by the endless feeding belt 13, and then are gradually transferred and fed onto the discs 1 of the driving endless chain conveyor A from the endless feeding belt 13 by means of a sending out endless belt 20 provided at an incline.

At this time, these three endless chains or belts, viz. A, B and 20, rotate at the same linear velocity, and so the bottles *a* practically do not rotate, making it possible to transfer them accurately onto the discs 1. They are steadied on the middle of the discs 1 by the rollers 2 and supporters 3.

Next, the bottles *a* being conveyed on the discs 1 come in contact with an endless belt 24 provided at the side thereof, and are made to rotate on the discs, by friction, through the difference between the speed of the bottles moving and the rotating speed of the endless belt 24. By means of their bump 25 being stopped by the stopper 4 protruding out above the surface of the discs 1, the desired position and direction of each bottle are set, thus preventing in the following printing operation any printing at wrong places or at crooked parts such as seams which are produced when making the bottles. While moving along, the bottles *a* whose direction have thus been set press against the squeezers 29, which are supplied with ink, through a screen 30 having a desired printing pattern, thereby rotating the bottles on the discs 1 and applying the desired printing process to their curved surface. So as to expect an accurate and vivid printing during this time, the bottles *a* and squeezers 29 are made to press against each other by means of the fixed press guides 32, 33, especially, at the beginning of the printing the bottles *a* are made to contact the screen 30 instantaneously and make the register perfect. The bottles *a* thus printed are clamped by means of clamps 43 which are provided at the side thereof and movable back and forth, and are transferred onto a conveyor belt 48 from the discs 1 and conveyed to a designated position, thereby completing the entire operation.

According to this invention, when printing the curved surface of bottles and the like, it is possible to carry out together, as described above, the operation of feeding the articles to be printed, the operation of setting the direction thereof, the printing operation and the delivering operation by a continuous apparatus which is very efficient; moreover, since the entire operation can be performed automatically, it can omit man power to an extreme and is suitable for mass production. This invention obtains an ideal apparatus for printing curved-surface of various kinds of articles.

I claim:

1. A conveyor apparatus comprising, in combination, a first conveyor belt; first moving means for moving said first conveyor belt in one direction at a given speed; a plurality of locating means on said first conveyor belt spaced a given distance from each other in longitudinal direction of said belt for receiving respectively a plurality of articles to be conveyed by said belt from one side edge thereof and for maintaining said articles spaced said given distance from each other during movement of said belt; a hopper for feeding the articles into said locating means and being formed with an outlet opening spaced from said one side edge of said first conveyor belt; a second endless conveyor belt formed with a plurality of pockets spaced from each other a distance equal to said given distance and being open toward one side edge of said second conveyor belt; drive means for driving said second conveyor belt at a speed equal to said given speed with said side edge of said second conveyor belt passing first in front of said outlet opening of said hopper and then substantially parallel to said one side edge of said first conveyor belt with said pockets respectively aligned in a direction transverse to said side edges with said spacer means; and transfer means for gradually transferring said articles from said pockets in said second conveyor belt to said spacer means on said first conveyor belt at portions of said belts at which said side edges thereof are substantially parallel to each other.

2. A conveyor apparatus comprising, in combination, a first conveyor belt; first moving means for moving said first conveyor belt in one direction at a given speed; a plurality of locating means on said first conveyor belt spaced a given distance from each other in longitudinal direction of said belt for receiving respectively a pulrality of articles to be conveyed by said belt from one side edge thereof and for maintaining said articles spaced said given distance from each other during movement of said belt; a hopper for feeding the articles into said locating means and being formed with an outlet opening spaced from said one side edge of said first conveyor belt; a second endless conveyor belt formed with a plurality of pockets spaced from each other a distance equal to said given distance and being open toward one side edge of said second conveyor belt; drive means for driving said second conveyor belt at a speed equal to said given speed with said side edge of said second conveyor belt passing first in front of said outlet opening of said hopper and then substantially parallel to said one side edge of said first conveyor belt with said pockets respectively aligned in a direction transverse to said side edges with said spacer means; and transfer means for gradually transferring said articles from said pockets in said second conveyor belt to said spacer means on said first conveyor belt at portions of said belts at which said side edges thereof are substantially parallel to each other, said transfer means comprising an elongated member including an acute angle with said one edge of said first conveyor belt.

3. A conveyor apparatus comprising, in combination, a first conveyor belt; first moving means for moving said first conveyor belt in one direction at a given speed; a plurality of locating means on said first conveyor belt spaced a given distance from each other in longitudinal direction of said belt for receiving respectively a plurality of articles to be conveyed by said belt from one side edge thereof and for maintaining said articles spaced said given distance from each other during movement of said belt; a hopper for feeding the articles into said locating means and being formed with an outlet opening spaced from said one side edge of said first conveyor belt; a second endless conveyor belt formed with a plurality of pockets spaced from each other a distance equal to said given distance and being open toward one side edge of said second conveyor belt; drive means for driving said second conveyor belt at a speed equal to said given speed with said side edge of said second conveyor belt passing first in front of said outlet opening of said hopper and then substantially parallel to said one side edge of said first conveyor belt with said pockets respectively aligned in a direction transverse to said side edges with said spacer means; and transfer means for gradually transferring said articles from said pockets in said second conveyor belt to said spacer means on said first conveyor belt at portions of said belts at which said side edges thereof are substantially parallel to each other, said transfer means comprising an endless transfer belt having a leg portion including an acute angle with said one side edge of said first conveyor belt, and moving means for moving said transfer belt so that the points on said leg portion of said transfer belt move in the same direction as said first conveyor belt and toward said one side edge thereof.

4. A conveyor apparatus comprising, in combintion, a first conveyor belt; first moving means for moving said first conveyor belt in one direction at a given speed; a plurality of locating means on said first conveyor belt spaced a given distance from each other in longitudinal direction of said belt for receiving respectively a plurality of articles to be conveyed by said belt from one side edge thereof and for maintaining said articles spaced said given distance from each other during movement of said belt; a hopper for feeding the articles into said locating means and being formed with an outlet opening spaced from said one side edge of said first conveyor belt; a second endless conveyor belt formed with a plurality of pockets spaced from each other a distance equal to said given distance and being open toward one side edge of said second conveyor belt; drive means for driving said second conveyor belt at a speed equal to said given speed with said edge of said second conveyor belt passing first in front of said outlet opening of said hopper and then substantially parallel to said one side edge of said first conveyor belt with said pockets respectively aligned in a direction transverse to said side edges with said spacer means; and transfer means for gradually transferring said articles from said pockets in said second conveyor belt to said spacer means on said first conveyor belt at portions of said belts at which said side edges thereof are substantially parallel to each other, said transfer means comprising an elongated stationary member including an acute angle with said one edge of said first conveyor belt, a plurality of push members respectively mounted on said second conveyor belt at each of the pockets thereof, each of said push members being movable in transverse direction of said second conveyor belt between a rest position in which one free end of said push member is located in said pocket and a transfer position in which said free end of said push member projects beyond said one edge of said second conveyor belt, each of said push members contacting at the other free end thereof said elongated member to be moved thereby during movement of said second conveyor belt from said rest position to said transfer position, and spring means operatively connected to each of said push members and tending to maintain the same in said rest position thereof.

References Cited in the file of this patent

UNITED STATES PATENTS

| | | |
|---|---|---|
| 927,762 | Allen | July 13, 1909 |
| 1,015,319 | Jefferies | Jan. 23, 1912 |
| 1,528,133 | Ross | Mar. 3, 1925 |
| 1,959,238 | Horsfield | May 15, 1934 |
| 2,027,102 | Hommel et al. | Jan. 7, 1936 |
| 2,121,491 | Soubier | June 21, 1938 |
| 2,198,068 | Wadsworth | Apr. 23, 1940 |
| 2,231,535 | Jackson et al. | Feb. 11, 1941 |
| 2,326,850 | Gladfelter et al. | Aug. 17, 1943 |
| 2,426,433 | Carter | Aug. 26, 1947 |
| 2,577,594 | Taylor | Dec. 4, 1951 |
| 2,621,841 | Simpson | Dec. 16, 1952 |
| 2,695,484 | Wilmer | Nov. 30, 1954 |
| 2,767,647 | Hakogi | Oct. 23, 1956 |